United States Patent
Lauster

(10) Patent No.: US 10,992,804 B2
(45) Date of Patent: Apr. 27, 2021

(54) HANDLING OF A PACKET SWITCHED EMERGENCY CALL WITHIN A TELECOMMUNICATIONS NETWORK AND/OR ENHANCED HANDLING OF LOCAL EMERGENCY SERVICE INFORMATION BY A USER EQUIPMENT

(71) Applicant: Deutsche Telekom AG, Bonn (DE)

(72) Inventor: Reinhard Lauster, St. Poelten (AT)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 16/486,511

(22) PCT Filed: Mar. 6, 2018

(86) PCT No.: PCT/EP2018/055514
§ 371 (c)(1),
(2) Date: Aug. 16, 2019

(87) PCT Pub. No.: WO2018/172067
PCT Pub. Date: Sep. 27, 2018

(65) Prior Publication Data
US 2020/0236216 A1    Jul. 23, 2020

(30) Foreign Application Priority Data
Mar. 22, 2017  (EP) ..................... 17162396

(51) Int. Cl.
*H04L 29/12* (2006.01)
*H04M 3/51* (2006.01)
*H04M 7/12* (2006.01)
*H04L 29/06* (2006.01)

(52) U.S. Cl.
CPC ......... *H04M 3/5116* (2013.01); *H04L 61/308* (2013.01); *H04M 7/123* (2013.01);
(Continued)

(58) Field of Classification Search
CPC ............... H04M 3/5116; H04M 7/123; H04M 2207/185; H04M 2242/04;
(Continued)

(56) References Cited

U.S. PATENT DOCUMENTS 9,602,552 B2 *  3/2017 Bakker ................ H04W 76/50
10,327,126 B2 *  6/2019 Suzuki .................... H04W 4/90
(Continued)

FOREIGN PATENT DOCUMENTS

| | | |
|---|---|---|
| EP | 3073771 A1 | 9/2016 |
| KR | 20090008302 A | 1/2009 |
| WO | WO 2009149096 A1 | 12/2009 |

*Primary Examiner* — Wutchung Chu
(74) *Attorney, Agent, or Firm* — Leydig, Voit & Mayer, Ltd.

(57) ABSTRACT

A telecommunications network comprises an access network and a core network. The access network is a packet switched oriented access network. A user equipment comprises or is able to access the local emergency service information. The local emergency service information is provisioned or provided to the user equipment by the telecommunications network or by another telecommunications network. A packet switched emergency call is initiated, by the user equipment, while the user equipment is connected to the telecommunications network, and an emergency uniform resource name is transmitted, by the user equipment, to a network node of the telecommunications network. The emergency uniform resource name comprises: country and/or network information; and emergency type information and/or emergency call telephone number information. The packet switched emergency call is transferred or routed to a public safety answering point. The public safety answering point is chosen based on the transmitted emergency uniform resource name.

13 Claims, 1 Drawing Sheet

(52) U.S. Cl.
CPC ...... *H04L 65/1006* (2013.01); *H04L 65/1016* (2013.01); *H04M 2207/185* (2013.01); *H04M 2242/04* (2013.01)

(58) Field of Classification Search
CPC ..... H04M 1/72536; H04M 2203/6009; H04M 2242/30; H04M 11/04; H04L 61/308; H04L 65/1006; H04L 65/1016; H04L 65/40; H04W 4/90; H04W 76/50; H04W 80/10; H04W 4/029; H04W 36/0022; H04W 36/14; H04W 36/22; H04W 40/24; H04W 4/18; H04W 88/06
See application file for complete search history.

(56) References Cited

U.S. PATENT DOCUMENTS

| | | | |
|---|---|---|---|
| 2008/0016556 A1 | 1/2008 | Selignan | |
| 2008/0227430 A1* | 9/2008 | Polk | H04M 1/72572 455/404.2 |
| 2010/0246780 A1* | 9/2010 | Bakker | H04L 65/1096 379/38 |
| 2010/0296634 A1* | 11/2010 | Schulzrinne | H04M 3/5116 379/45 |
| 2011/0099281 A1* | 4/2011 | Bakker | H04L 65/1016 709/228 |
| 2011/0134897 A1* | 6/2011 | Montemurro | H04W 48/14 370/338 |
| 2011/0141979 A1* | 6/2011 | Keller | H04W 36/0022 370/328 |
| 2011/0189971 A1* | 8/2011 | Faccin | H04W 76/10 455/404.1 |
| 2013/0029629 A1* | 1/2013 | Lindholm | H04W 36/0022 455/404.1 |
| 2016/0100435 A1* | 4/2016 | Bakker | H04W 4/90 455/404.1 |
| 2016/0227391 A1* | 8/2016 | Tanaka | H04M 3/5116 |
| 2017/0366955 A1* | 12/2017 | Edge | H04M 11/04 |
| 2018/0054721 A1* | 2/2018 | Choe | H04W 4/02 |
| 2018/0124584 A1* | 5/2018 | Venkatraman | H04M 3/5116 |

* cited by examiner

HANDLING OF A PACKET SWITCHED EMERGENCY CALL WITHIN A TELECOMMUNICATIONS NETWORK AND/OR ENHANCED HANDLING OF LOCAL EMERGENCY SERVICE INFORMATION BY A USER EQUIPMENT

CROSS-REFERENCE TO PRIOR APPLICATIONS

This application is a U.S. National Phase Application under 35 U.S.C. § 371 of International Application No. PCT/EP2018/055514, filed on Mar. 6, 2018, and claims benefit to European Patent Application No. EP 17162396.0, filed on Mar. 22, 2017. The International Application was published in English on Sep. 27, 2018 as WO 2018/172067 A1 under PCT Article 21(2).

FIELD

The present invention relates a method for improved handling of a packet switched emergency call within a telecommunications network and/or for enhanced handling of local emergency service information by a user equipment, wherein the packet switched emergency call is or is to be initiated by the user equipment while the user equipment is connected to the telecommunications network, the telecommunications network comprising an access network and a core network, and the access network being a packet switched oriented access network, wherein the user equipment comprises or is able to access local emergency service information being provisioned or provided to the user equipment by the telecommunications network or by another telecommunications network.

Furthermore, the present invention relates to a system for improved handling of an packet switched emergency call within a telecommunications network and/or for enhanced handling of local emergency service information by a user equipment, wherein the system comprises the telecommunications network and the user equipment, wherein the packet switched emergency call is or is to be initiated by the user equipment while the user equipment is connected to the telecommunications network, the telecommunications network comprising an access network and a core network, and the access network being a packet switched oriented access network, wherein the user equipment comprises or is able to access local emergency service information being provisioned or provided to the user equipment by the telecommunications network or by another telecommunications network.

Also, the present invention relates to a telecommunications network for improved handling of an packet switched emergency call within the telecommunications network and/or for enhanced handling of local emergency service information by a user equipment, wherein the packet switched emergency call is or is to be initiated by the user equipment while the user equipment is connected to the telecommunications network, the telecommunications network comprising an access network and a core network, and the access network being a packet switched oriented access network, wherein the user equipment comprises or is able to access local emergency service information being provisioned or provided to the user equipment by the telecommunications network or by another telecommunications network.

Also, the present invention relates to a user equipment for improved handling of an packet switched emergency call within a telecommunications network and/or for enhanced handling of local emergency service information by the user equipment, wherein the packet switched emergency call is or is to be initiated by the user equipment while the user equipment is connected to the telecommunications network, the telecommunications network comprising an access network and a core network, and the access network being a packet switched oriented access network, wherein the user equipment comprises or is able to access local emergency service information being provisioned or provided to the user equipment by the telecommunications network or by another telecommunications network.

Additionally, the present invention relates to a program and to a computer program product for improved handling of a packet switched emergency call within a telecommunications network and/or for enhanced handling of local emergency service information by a user equipment.

BACKGROUND

Usually, emergency services and emergency call telephone numbers are defined locally by numbering plans following national regulations. It is possible to provision local emergency call telephone numbers and optionally category information related to the emergency call telephone numbers to a user equipment (3GPP TS 24.008). If such category information is included, the user equipment (UE) can create an emergency uniform resource name (URN) (sos-URN). However, category information is only used for circuit switched emergency calls and only seven categories are available (i.e. fire, ambulance, police, mountain rescue, sea rescue, automatic eCall, manual eCall). All other provisioned emergency call telephone numbers are translated to the top level sos-URN, wherein the specific emergency service (that the user is trying to reach) cannot be distinguished by the network and the call is not automatically routed to the specific public safety answering point which is responsible for the specific category/type (e.g., fire, ambulance, police, etc.) that the user is trying to reach. Thus, the emergency call procedure, especially for packet-switched emergency calls, is time and resource consuming. If an emergency number is not provisioned to a user equipment (e.g., an IP multimedia subsystem (IMS) user equipment or generic session initiation protocol (SIP) user equipment, etc.) and the user dials such an unknown emergency call telephone number, the user equipment will initiate the call setup as a normal call using the dialed number, which requires a high effort in network provisioning by the home network operator.

SUMMARY

In an exemplary embodiment, the present invention provides a method for an improved handling of a packet switched emergency call within a telecommunications network and/or for an enhanced handling of local emergency service information by a user equipment. The packet switched emergency call is or is to be initiated by the user equipment while the user equipment is connected to the telecommunications network, the telecommunications network comprising an access network and a core network, and the access network being a packet switched oriented access network. The user equipment comprises or is able to access local emergency service information being provisioned or provided to the user equipment by the telecommunications network or by another telecommunications network. The method comprises at least the following steps: in a first step, the packet switched emergency call is initiated and an emergency uniform resource name is transmitted, by the user equipment, to a network node of the telecommunications network, wherein the emergency uniform resource name comprises both a country and/or network information and at least one out of an emergency type information and an emergency call telephone number information; and in a second step subsequent to the first step, the packet switched emergency call is transferred or routed to a public safety answering point, wherein the public safety answering point is chosen in dependency of the transmitted emergency uniform resource name.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
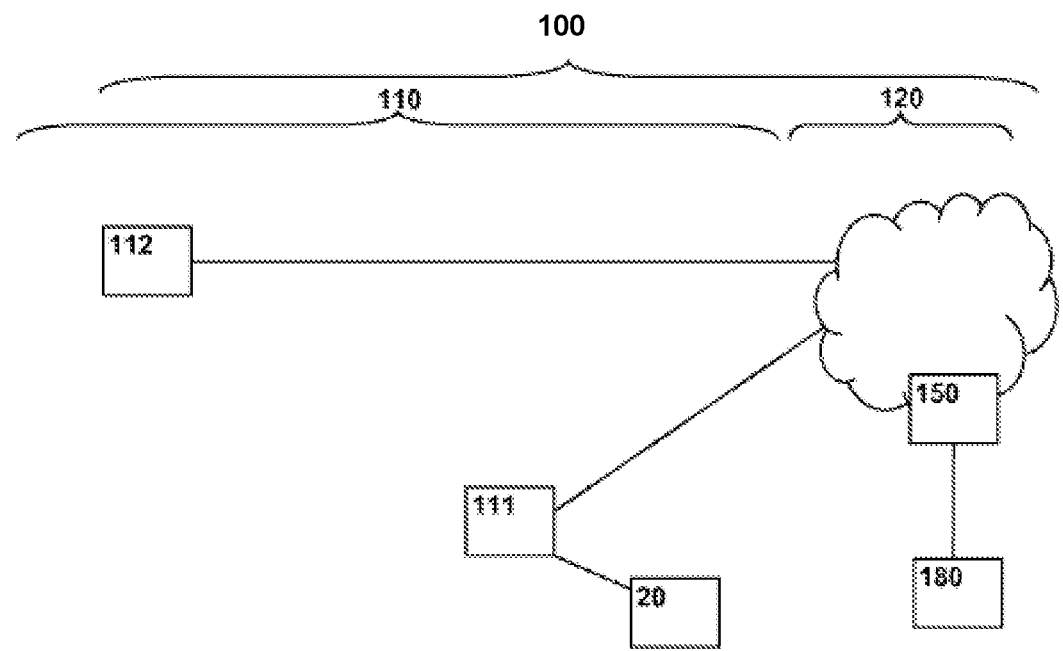
FIG. 1 schematically illustrates a system comprising a telecommunications network according to an embodiment of the present invention.

Exemplary embodiments of the present invention facilitate the routing of packet switched emergency calls to a designated, specific public safety answering point in order to reduce latencies and/or save resources.

In an exemplary embodiment, the present invention provides a method for improved handling of a packet switched emergency call within a telecommunications network and/or for enhanced handling of local emergency service information by a user equipment,
wherein the packet switched emergency call is or is to be initiated by the user equipment while the user equipment is connected to the telecommunications network, the telecommunications network comprising an access network and a core network, and the access network being a packet switched oriented access network,
wherein the user equipment comprises or is able to access local emergency service information being provisioned or provided to the user equipment by the telecommunications network or by another telecommunications network, wherein the method comprises at least the following steps:
in a first step, the packet switched emergency call is initiated and an emergency uniform resource name is transmitted, by the user equipment, to a network node of the telecommunications network, wherein the emergency uniform resource name comprises both country and/or network information and at least one out of an emergency type information and emergency call telephone number information,
in a second step subsequent to the first step, the packet switched emergency call is transferred or routed to a public safety answering point, wherein the public safety answering point is chosen in dependency of the transmitted emergency uniform resource name.

It is thereby advantageously possible according to the present invention to improve the handling of a packet switched emergency call within a telecommunications network and to enhance the handling of local emergency service information by a user equipment. For this purpose it is possible that local emergency service information is provisioned or provided to a user equipment especially before an emergency call is launched or initiated by the user equipment (for example by providing local emergency service information to the user equipment and storing said information within a local storage of the user equipment or by providing local emergency service information in such a way that it is retrievable by the user equipment, e.g., within a database of the telecommunications network that can be accessed by the user equipment). It is especially possible that emergency uniform resource names ("sos.URNs") are comprised in or can be generated (especially by the user equipment) from pieces of provisioning information comprised in the local emergency service information. Within a first step, the packet switched emergency call is initiated (by the user equipment or by a user of the user equipment, e.g. by dialing an emergency call telephone number that has been provisioned or provided—as part of the access local emergency service information—to the user equipment) and an emergency uniform resource name is transmitted, by the user equipment, to a network node of the telecommunications network. The emergency uniform resource name advantageously comprises both country and/or network information and at least one out of emergency type information and emergency call telephone number information, which enables the telecommunications network to route or transfer the emergency call to a (designated, specific) public safety answering point. It is possible that the (designated, specific) public safety answering point is chosen (especially by the telecommunications network or an entity thereof) in dependency of the transmitted emergency uniform resource name, since at least country and/or network information as well as emergency type information and/or emergency call telephone number information is comprised in the emergency uniform resource name, which allows for identifying a (designated) public safety answering point for the packet switched emergency call. As a consequence, it is advantageously possible that a packet switched emergency call is routed/transferred in an automated way to a (specific, designated) public safety answering point, which saves resources and time in comparison with methods known from the state of the art.

According to an embodiment of the method according to the present invention, the public safety answering point is chosen
either in dependency of the emergency type information of the emergency uniform resource name and/or the emergency call telephone number information of the emergency uniform resource name,
or in dependency of the country and/or network information and of the emergency type information of the emergency uniform resource name and/or of the country and/or network information and of the emergency call telephone number information of the emergency uniform resource name.

Thereby, it is advantageously possible according to an embodiment of the present invention that the country and/or network information comprise or correspond to the mobile country code (mcc) and/or the mobile network code (mnc) and/or the public land mobile network-identifier (plmn-id). It is also advantageously possible that the country information comprises or corresponds to a real country code (e.g., ISO 3166-1; e.g., "de", "it", etc.).

According to an embodiment of the method according to the present invention, the access network is a packet switched-only access network, and wherein especially the core network is a packet switched core network, wherein especially the public safety answering point is connected to the core network via a circuit switched network and/or wherein especially the access network and/or the core network is or corresponds to a network slice dedicated to handle packet switched emergency calls.

Thereby, it is advantageously possible according to an embodiment of the present invention that the packet switched emergency call is at least transmitted using packet switching between the user equipment and (an entity of) the core network. However, it is especially advantageously possible that the packed switched emergency call is transmitted from (the entity of) the core network to the public safety answering point via a circuit switched network (i.e. via circuit switching). It is also advantageously possible according to an embodiment of the present invention that the core network is or corresponds to a network slice (especially of a 5G network) dedicated to handle packet switched emergency calls.

According to an embodiment of the method according to the present invention, the local emergency service information comprises pieces of provisioning information related to different emergency services and/or related to different emergency call telephone numbers, especially related to more than seven types of emergency services, wherein the emergency uniform resource name is related to at least one piece of provisioning information of the local emergency service information, wherein the pieces of provisioning information especially comprise an emergency uniform resource name for each type of emergency service and/or for each emergency call telephone number.

Thereby, it is advantageously possible that an emergency uniform resource name (especially for each type of emergency service and/or each emergency call telephone number) is comprised in the local emergency service information or can be generated from pieces of provisioning information comprised in the local emergency service information (especially by the user equipment).

According to an embodiment of the method according to the present invention, the local emergency service information comprises pieces of further provisioning information, wherein the further provisioning information is related
to at least one clear text message for each type of emergency service or for each emergency call telephone number, and/or
to at least one audio message for each type of emergency service or for each emergency call telephone number, and/or
to graphical information for each type of emergency service or for each emergency call telephone number,
wherein—during the first step and prior to initiating the packet switched emergency call—the further provisioning information is displayed or played or otherwise signaled.

Thereby, it is advantageously possible that further provisioning information is displayed, played or signaled in another way to the user before (or when starting to) initiating the emergency call. It is possible that for each type of emergency service or for each emergency call telephone number provisioned to the user equipment (via/as part of the local emergency service information) a specific clear text message, icon, pictogram, video message, audio message etc. is displayed or played to the user (or is accessible to the user, e.g., via a menu of the user equipment) such that the user can initiate the packet switched emergency call by dialing/choosing the correct emergency call telephone number and consequently transmitting the correct an emergency uniform resource name (even if the user does not know the emergency call telephone number of the public safety answering point that he wants to call/access).

According to an embodiment of the method according to the present invention, wherein the access network comprises a plurality of base station entities, wherein the user equipment is connected to the telecommunications network via one of the base station entities.

According to an embodiment of the present invention, the telecommunications network is a session initiation protocol (SIP) based telecommunications network, preferably the telecommunications network is an IP Multimedia Subsystem or IP Multimedia Core Network Subsystem (IMS) network, capable of delivering IP multimedia services.

Furthermore, the present invention relates to a system for improved handling of an packet switched emergency call within a telecommunications network and/or for enhanced handling of local emergency service information by a user equipment,
wherein the system comprises the telecommunications network and the user equipment,
wherein the packet switched emergency call is or is to be initiated by the user equipment while the user equipment is connected to the telecommunications network, the telecommunications network comprising an access network and a core network, and the access network being a packet switched oriented access network,
wherein the user equipment comprises or is able to access local emergency service information being provisioned or provided to the user equipment by the telecommunications network or by another telecommunications network,
wherein the system is configured such that:
the packet switched emergency call is initiated and an emergency uniform resource name is transmitted, by the user equipment, to a network node of the telecommunications network, wherein the emergency uniform resource name comprises both country and/or network information and at least one out of emergency type information and emergency call telephone number information,
the packet switched emergency call is transferred or routed to a public safety answering point, wherein the public safety answering point is chosen in dependency of the transmitted emergency uniform resource name.

According to an embodiment of the system according to the present invention, the system is configured such that the public safety answering point is chosen
either in dependency of the emergency type information of the emergency uniform resource name and/or the emergency call telephone number information of the emergency uniform resource name,
or in dependency of the country and/or network information and of the emergency type information of the emergency uniform resource name and/or of the country and/or network information and of the emergency call telephone number information of the emergency uniform resource name.

Furthermore, the present invention relates to a telecommunications network for improved handling of an packet switched emergency call within the telecommunications network and/or for enhanced handling of local emergency service information by a user equipment,
wherein the packet switched emergency call is or is to be initiated by the user equipment while the user equipment is connected to the telecommunications network, the telecommunications network comprising an access network and a core network, and the access network being a packet switched oriented access network, wherein the user equipment comprises or is able to access local emergency service information being provisioned or provided to the user equipment by the telecommunications network or by another telecommunications network, wherein the telecommunications network is configured such that:

the packet switched emergency call is initiated and an emergency uniform resource name is transmitted, by the user equipment, to a network node of the telecommunications network, wherein the emergency uniform resource name comprises both country and/or network information and at least one out of emergency type information and emergency call telephone number information, the packet switched emergency call is transferred or routed to a public safety answering point, wherein the public safety answering point is chosen in dependency of the transmitted emergency uniform resource name.

According to an embodiment of the telecommunications network according to the present invention, the telecommunications network is configured such that the public safety answering point is chosen either in dependency of the emergency type information of the emergency uniform resource name and/or the emergency call telephone number information of the emergency uniform resource name, or in dependency of the country and/or network information and of the emergency type information of the emergency uniform resource name and/or of the country and/or network information and of the emergency call telephone number information of the emergency uniform resource name.

Also, the present invention relates to a user equipment for improved handling of an packet switched emergency call within a telecommunications network and/or for enhanced handling of local emergency service information by the user equipment, wherein the packet switched emergency call is or is to be initiated by the user equipment while the user equipment is connected to the telecommunications network, the telecommunications network comprising an access network and a core network, and the access network being a packet switched oriented access network, wherein the user equipment comprises or is able to access local emergency service information being provisioned or provided to the user equipment by the telecommunications network or by another telecommunications network, wherein the user equipment is configured such that:

the packet switched emergency call is initiated and an emergency uniform resource name is transmitted, by the user equipment, to a network node of the telecommunications network, wherein the emergency uniform resource name comprises both country and/or network information and at least one out of emergency type information and emergency call telephone number information, the packet switched emergency call is transferred or routed to a public safety answering point, wherein the public safety answering point is chosen in dependency of the transmitted emergency uniform resource name.

According to an embodiment of the user equipment according to the present invention, the local emergency service information comprises pieces of further provisioning information, wherein the further provisioning information is related to at least one clear text message for each type of emergency service or for each emergency call telephone number, and/or to at least one audio message for each type of emergency service or for each emergency call telephone number, and/or to graphical information for each type of emergency service or for each emergency call telephone number, wherein—during the first step and prior to initiating the packet switched emergency call—the further provisioning information is displayed or played or otherwise signaled.

Additionally, the present invention relates to program comprising a computer readable program code which, when executed on a computer or on a network node of a telecommunications network or on a user equipment, or in part on the network node of the telecommunications network and in part on the user equipment, causes the computer or the network node of the telecommunications network or the user equipment to perform a method according to the present invention.

Still additionally, the present invention relates to a computer program product for improved handling of a packet switched emergency call within a telecommunications network and/or for enhanced handling of local emergency service information by a user equipment, the computer program product comprising a computer program stored on a storage medium, the computer program comprising program code which, when executed on a computer or on a network node of a telecommunications network or on a user equipment, or in part on the network node of the telecommunications network and in part on the user equipment, causes the computer or the network node of the telecommunications network or the user equipment to perform a method according the present invention.

These and other characteristics, features and advantages of the present invention will become apparent from the following detailed description, taken in conjunction with the accompanying drawings, which illustrate, by way of example, principles of the invention. The description is given for the sake of example only, without limiting the scope of the invention. The reference figures quoted below refer to the attached drawings.

The present invention will be described with respect to exemplary embodiments and with reference to certain drawings but the invention is not limited thereto but only by the claims. The drawings described are only illustrative and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a system comprising a telecommunications network 100 according to an embodiment of the present invention is schematically illustrated. The telecommunications network 100 comprises an access network 110 and a core network 120. The access network 110 typically comprises a plurality of base station entities 111, 112. A user equipment 20 is connected to the telecommunications network 100 via the base station entity 111. Preferably, the access network 110 is a packet switched-oriented access network and the core network 120 is a packet switched core network and/or the access network 110 and/or the core network 120 is or corresponds to a network slice dedicated to handle packet switched emergency calls. Furthermore, the telecommunications network 100 comprises a network node 150, especially as part of the core network 120 (usually the telecommunications network 100 comprises a multitude of network nodes). Additionally, a public safety answering point 180 is connected to the core network 120 or is part of the core network 120. It is also possible that the public safety answering point 180 is connected to the core network 120 (which is preferably a packet switched oriented core network) via a circuit switched network.

Figure 2:
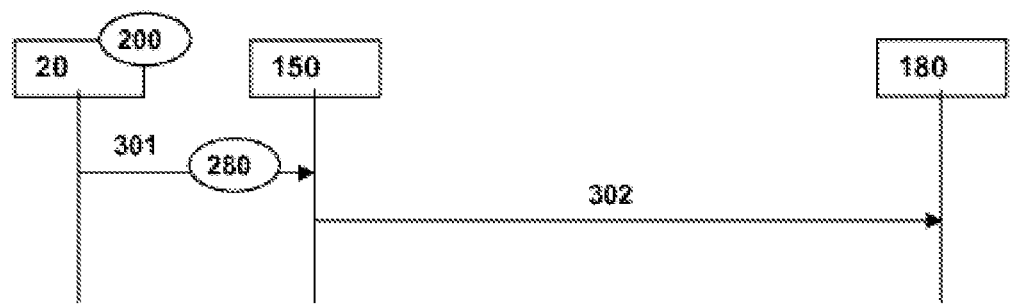
FIG. 2 schematically illustrates a method according to an embodiment of the present invention.

In FIG. 2, a method according to an embodiment of the present invention is schematically illustrated. Therein, a packet switched emergency call is or is to be initiated by a user equipment 20 while the user equipment 20 is connected to the telecommunications network 100. The telecommunications network 100 comprises an access network 110 and a core network 120. The access network 110 is a packet switched oriented access network. The user equipment 20 comprises (e.g. within a storage element of the user equipment 20) and/or is able to access local emergency service information 200 (e.g., from a database that is part of the telecommunications network 100 and accessible by the user equipment 20 at the time, when the packet switched emergency call is or is to be initiated by the user equipment, or before the packet switched emergency call is or is to be initiated by the user equipment). It is preferred that local emergency service information 200 is provisioned or provided (or has been provided well before the packet switched emergency call is or is to be initiated) to the user equipment 20 by the telecommunications network 100 or by another telecommunications network. The local emergency service information 200 especially comprises pieces of provisioning information related to different emergency services and/or related to different emergency call telephone numbers (i.e. pieces of provisioning information regarding or concerning or specifying different emergency call telephone numbers and/or different emergency services are part of the emergency service information 200). It is preferably possible that the emergency service information 200 is related to more than seven types of emergency services. In a first step, the packet switched emergency call is initiated by the user, e.g., when dialing an emergency call telephone number which has been provisioned or provided to the user equipment 20 (especially as part of the local emergency service information 200). Therein, in a first processing step 301, an emergency uniform resource name 280 is transmitted, by the user equipment 20, to a network node 150 of the telecommunications network 100 (possibly via intermediate network nodes of the telecommunications network). The emergency uniform resource name 280 comprises both country and/or network information and at least one out of emergency type information and emergency call telephone number information. Preferably, the emergency uniform resource name 280 is related to at least one piece of provisioning information of the local emergency service information 200. It is possible that the emergency uniform resource name 280 is comprised (or part of) the local emergency service information 200 or that the emergency uniform resource name 280 is comprised (or part of) at least one piece of provisioning information comprised in the local emergency service information 200. It is also possible that the emergency uniform resource name 280 is generated based on at least one piece of provisioning information comprised in the local emergency service information 200, especially by the user equipment 20. In a second step subsequent to the first step, the packet switched emergency call is transferred or routed to a public safety answering point 180 (that is preferably associated to the emergency type information and/or the emergency call telephone number information comprised in the emergency uniform resource name 280 and/or that is preferably responsible for handling/receiving incoming emergency calls related to the emergency type information and/or the emergency call telephone number information comprised in the emergency uniform resource name 280). For this purpose, the emergency call is especially transmitted from the network node 150 to the public safety answering point 180 within a second processing step 302. The public safety answering point 180 is chosen (preferably automatically by the telecommunications network 100 or a network node or the network node 150 of the telecommunications network 100) in dependency of the transmitted emergency uniform resource name 280. It is therefore possible, that a packet switched emergency call is directly routed or transferred or transmitted to the (specific) public safety answering point 180 that is responsible for handling the incoming emergency call. Thus, it can be avoided that packet switched emergency calls are first routed to a general public safety answering point and have to be transferred from the general public safety answering point to a (specific) public safety answering point 180 that is responsible for handling incoming emergency calls related to the emergency type information and/or the emergency call telephone number information (and in particular for handling emergency calls of the number dialed by the user when initiating the packet switched emergency call).

It is possible that an emergency uniform resource name according to an embodiment of the present invention, wherein an emergency type information is comprised in the emergency uniform resource name, looks as follows:
Network Location-Number+Category-emergency uniform resource name-clear text message:
MCC:222-117 (not cat.)-sos.country-specific.mcc222. finanza-"Finanze Guard"
MCC:222-113 (not cat.)-sos.country-specific.mcc222. polizia-"Polizia"
MCC:222-112 (not cat.)-sos.country-specific.mcc222. carabineri-"Carabinieri"

It is possible that an emergency uniform resource name according to an embodiment of the present invention, wherein an emergency call telephone number information is comprised in the emergency uniform resource name, looks as follows:
Network Location-Number+Category-emergency uniform resource name:
MCC:222-117 (not cat.)-sos.country-specific.mcc222.117
MCC:222-113 (not cat.)-sos.country-specific.mcc222.113
MCC:222-112 (not cat.)-sos.country-specific.mcc222.112

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for handling of a packet switched emergency call within a telecommunications network and/or for handling of local emergency service information by a user equipment,
wherein the method comprises:
in a first step, initiating, by the user equipment, a packet switched emergency call while the user equipment is connected to the telecommunications network, and transmitting, by the user equipment, an emergency uniform resource name to a network node of the telecommunications network, wherein the telecommunications network comprises an access network and a core network, wherein the access network is a packet switched oriented access network, wherein the user equipment comprises or has access to local emergency service information provisioned or provided to the user equipment by the telecommunications network or by another telecommunications network, and wherein the emergency uniform resource name comprises:
country and/or network information; and
emergency type information and/or emergency call telephone number information; and
in a second step subsequent to the first step, transferring or routing the packet switched emergency call to a public safety answering point, wherein the public safety answering point is chosen based on the transmitted emergency uniform resource name.

2. The method according to claim 1, wherein the public safety answering point is chosen based on:
the emergency type information of the emergency uniform resource name; and/or
the emergency call telephone number information of the emergency uniform resource name.

3. The method according to claim 1, wherein the access network is a packet switched-only access network;
wherein the core network is a packet switched core network;
wherein the public safety answering point is connected to the core network via a circuit switched network; and/or
wherein the access network and/or the core network is or corresponds to a network slice dedicated to handle packet switched emergency calls.

4. The method according to claim 1, wherein the local emergency service information comprises pieces of provisioning information related to different emergency services and/or related to different emergency call telephone numbers;
wherein the emergency uniform resource name is related to at least one piece of provisioning information of the local emergency service information; and
wherein the pieces of provisioning information comprise an emergency uniform resource name for each type of emergency service and/or for each emergency call telephone number.

5. The method according to claim 4, wherein the local emergency service information comprises further provisioning information, wherein the further provisioning information is related to:
at least one clear text message for each type of emergency service or for each emergency call telephone number;
at least one audio message for each type of emergency service or for each emergency call telephone number; and/or
at least one graphical information for each type of emergency service or for each emergency call telephone number; and
wherein—during the first step and prior to initiating the packet switched emergency call—the further provisioning information is displayed or played or otherwise signaled.

6. The method according to claim 1, wherein the access network comprises a plurality of base station entities; and
wherein the user equipment is connected to the telecommunications network via one of the base station entities.

7. The method according to claim 1, wherein the local emergency service information comprises pieces of provisioning information related to more than seven types of emergency services and/or related to different emergency call telephone numbers related to more than seven types of emergency services;
wherein the emergency uniform resource name is related to at least one piece of provisioning information of the local emergency service information; and
wherein the pieces of provisioning information comprise an emergency uniform resource name for each type of emergency service and/or for each emergency call telephone number.

8. A telecommunications system for handling of a packet switched emergency call within a telecommunications network and/or for handling of local emergency service information by a user equipment, wherein the system comprises:
the telecommunications network, wherein the telecommunications network comprises an access network and a core network, wherein the access network is a packet switched oriented access network; and
the user equipment,
wherein the user equipment comprises or has access to local emergency service information provisioned or provided to the user equipment by the telecommunications network or by another telecommunications network;
wherein the user equipment is configured to initiate
the packet switched emergency call while the user equipment is connected to the telecommunications network and transmit an emergency uniform resource name to a network node of the telecommunications network, wherein the emergency uniform resource name comprises:
country and/or network information; and
emergency type information and/or emergency call telephone number information; and
wherein telecommunications network is configured to transfer or route the packet switched emergency call to a public safety answering point, wherein the public safety answering point is chosen based on the transmitted emergency uniform resource name.

9. The system according to claim 8, wherein the public safety answering point is chosen based on:
the emergency type information of the emergency uniform resource name; and/or
the emergency call telephone number information of the emergency uniform resource name.

10. A user equipment for handling of a packet switched emergency call within a telecommunications network and/or for handling of local emergency service information, wherein the user equipment comprises a processor and a non-transitory computer-readable medium having processor-executable instructions stored thereon, wherein the processor-executable instructions, when executed by the processor, facilitate:
initiating, by the user equipment, the packet switched emergency call while the user equipment is connected to the telecommunications network; and
transmitting, by the user equipment, an emergency uniform resource name to a network node of the telecommunications network, wherein the emergency uniform resource name comprises:
country and/or network information; and
emergency type information and/or an emergency call telephone number information;
wherein transmission of the emergency uniform resource name facilitates transferring or routing of the packet switched emergency call to a public safety answering point chosen based on the transmitted emergency uniform resource name; and
wherein the user equipment comprises or has access to local emergency service information provisioned or provided to the user equipment by the telecommunications network or by another telecommunications network.

11. The user equipment according to claim 10, wherein the local emergency service information comprises pieces of provisioning information related to different emergency services and/or related to different emergency call telephone numbers;
wherein the local emergency service information comprises further provisioning information, wherein the further provisioning information is related to:
at least one clear text message for each type of emergency service or for each emergency call telephone number;
at least one audio message for each type of emergency service or for each emergency call telephone number; and/or
at least one graphical information for each type of emergency service or for each emergency call telephone number; and
wherein—prior to initiating the packet switched emergency call—the further provisioning information is displayed or played or otherwise signaled.

12. The user equipment according to claim 10, wherein the telecommunications network comprises an access network and a core network, wherein the access network is a packet switched oriented access network.

13. One or more non-transitory computer-readable mediums having processor-executable instructions stored thereon for handling of a packet switched emergency call within a telecommunications network and/or for handling of local emergency service information by a user equipment, wherein the processor-executable instructions, when executed, facilitate:
in a first step, initiating, by the user equipment, a packet switched emergency call while the user equipment is connected to the telecommunications network, and transmitting, by the user equipment, an emergency uniform resource name to a network node of the telecommunications network, wherein the telecommunications network comprises an access network and a core network, wherein the access network is a packet switched oriented access network, wherein the user equipment comprises or has access to local emergency service information provisioned or provided to the user equipment by the telecommunications network or by another telecommunications network, and wherein the emergency uniform resource name comprises:
country and/or network information; and
emergency type information and/or emergency call telephone number information; and
in a second step subsequent to the first step, transferring or routing the packet switched emergency call to a public safety answering point, wherein the public safety answering point is chosen based on the transmitted emergency uniform resource name.

* * * * *